United States Patent [19]

Appleberry

[11] 4,141,259
[45] Feb. 27, 1979

[54] SEQUENCING DEVICE UTILIZING PLANETARY GEAR SET

[76] Inventors: James C. Fletcher, Administrator of the National Aeronautics and Space Administration, with respect to an invention of Walter T. Appleberry, Long Beach, Calif.

[21] Appl. No.: 772,168

[22] Filed: Feb. 25, 1977

[51] Int. Cl.² .......................................... F16H 37/06
[52] U.S. Cl. ...................................... 74/674; 74/705; 74/764
[58] Field of Search ................ 74/764, 753, 674, 705, 74/812, 817

[56] References Cited

U.S. PATENT DOCUMENTS 3,116,817  1/1964  Quick et al. ........................ 74/764 X
3,548,679  12/1970  Woodford ............................. 74/674
3,886,816  6/1975  De Feo et al. ..................... 74/674 X Primary Examiner—Benjamin W. Wyche
Assistant Examiner—Frank H. McKenzie, Jr.
Attorney, Agent, or Firm—Edward K. Fein; John R. Manning; Marvin F. Matthews

[57] ABSTRACT

A planetary (epicyclic) gear set is provided with a reversible rotating input shaft and individual outputs shafts actuated, respectively, by the ring gear and planet gear carrier. Latch means is positioned to selectively and automatically stop the ring gear or carrier member while releasing the other to provide the desired sequential output operation. The output shafts are reversed in sequence and direction of rotation by reversing rotational direction of the input shaft.

14 Claims, 9 Drawing Figures

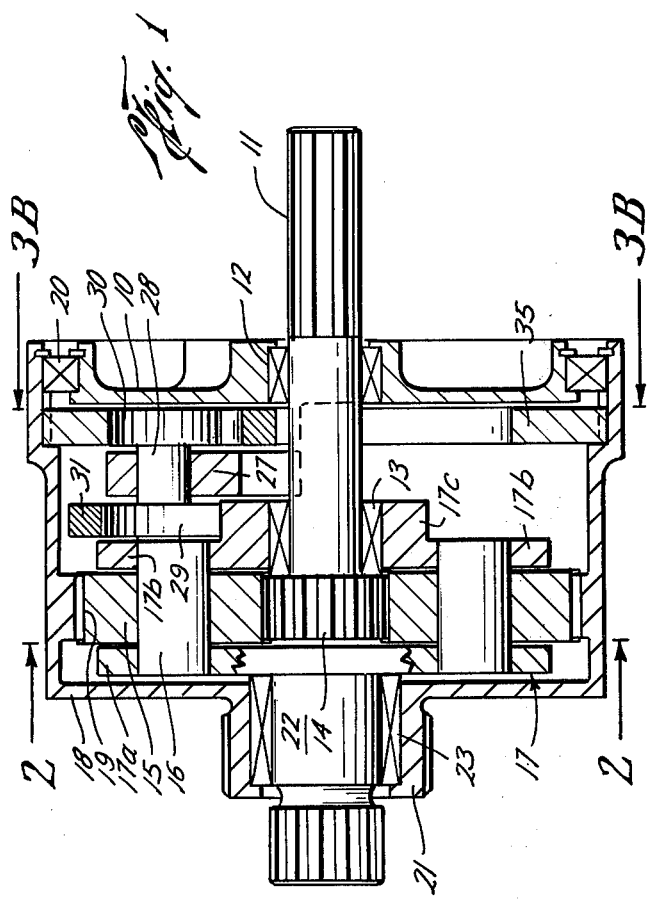
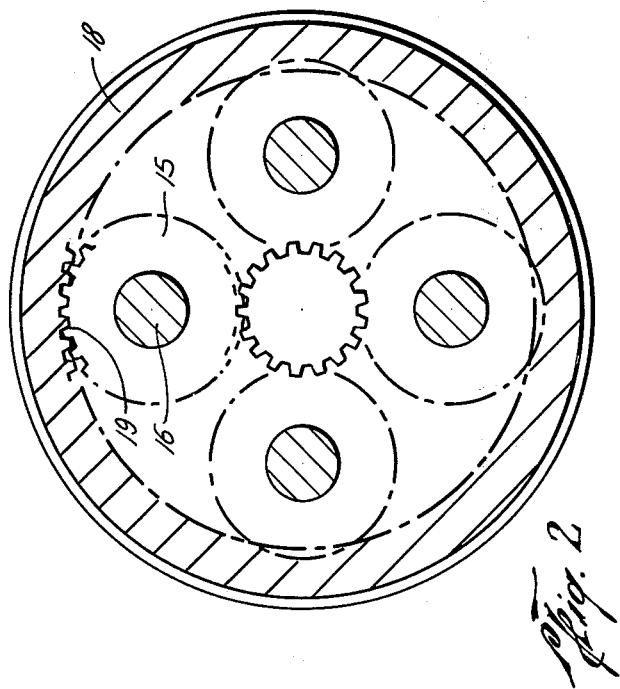
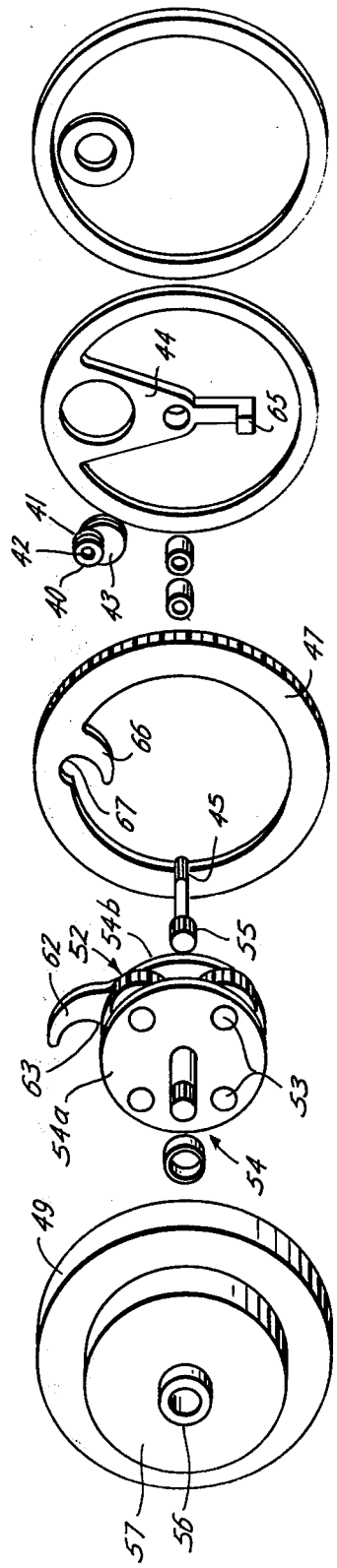

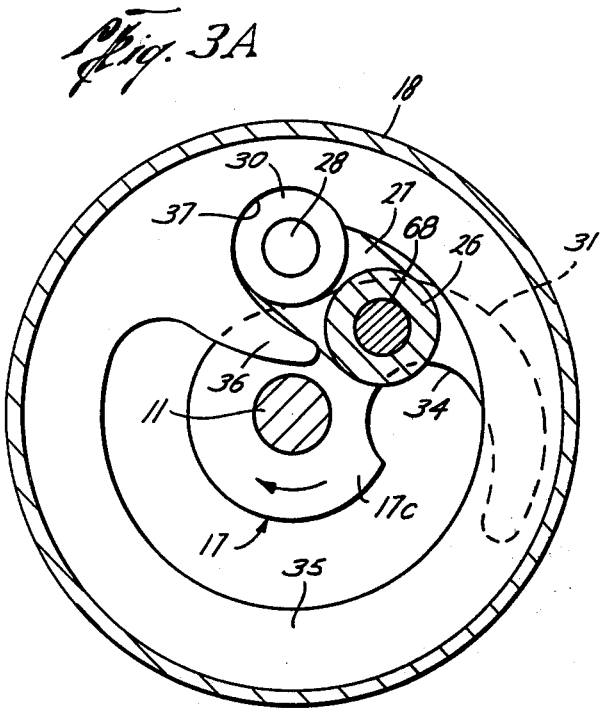
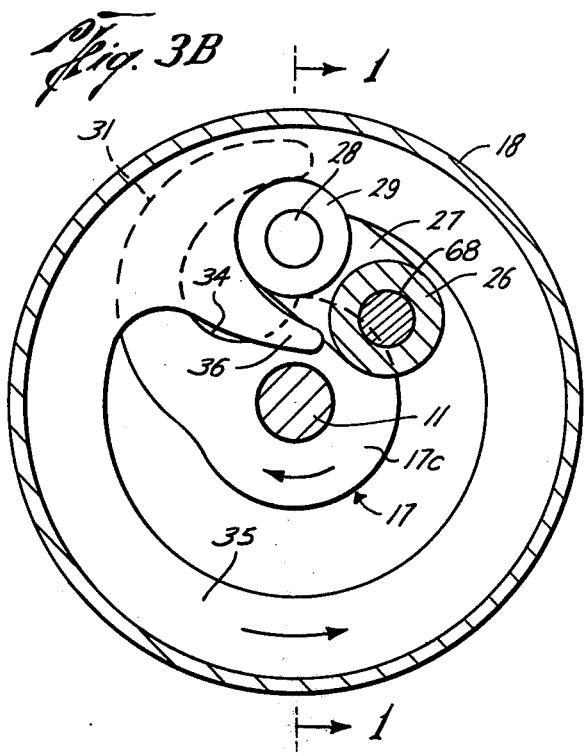
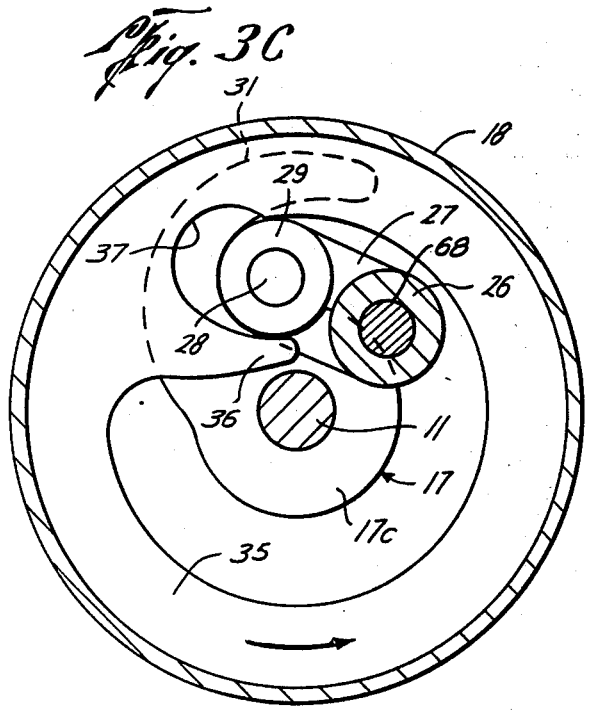
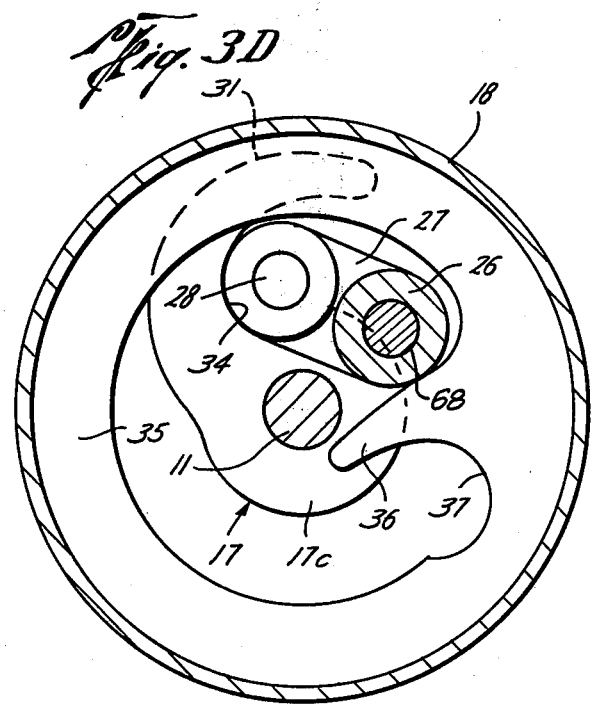

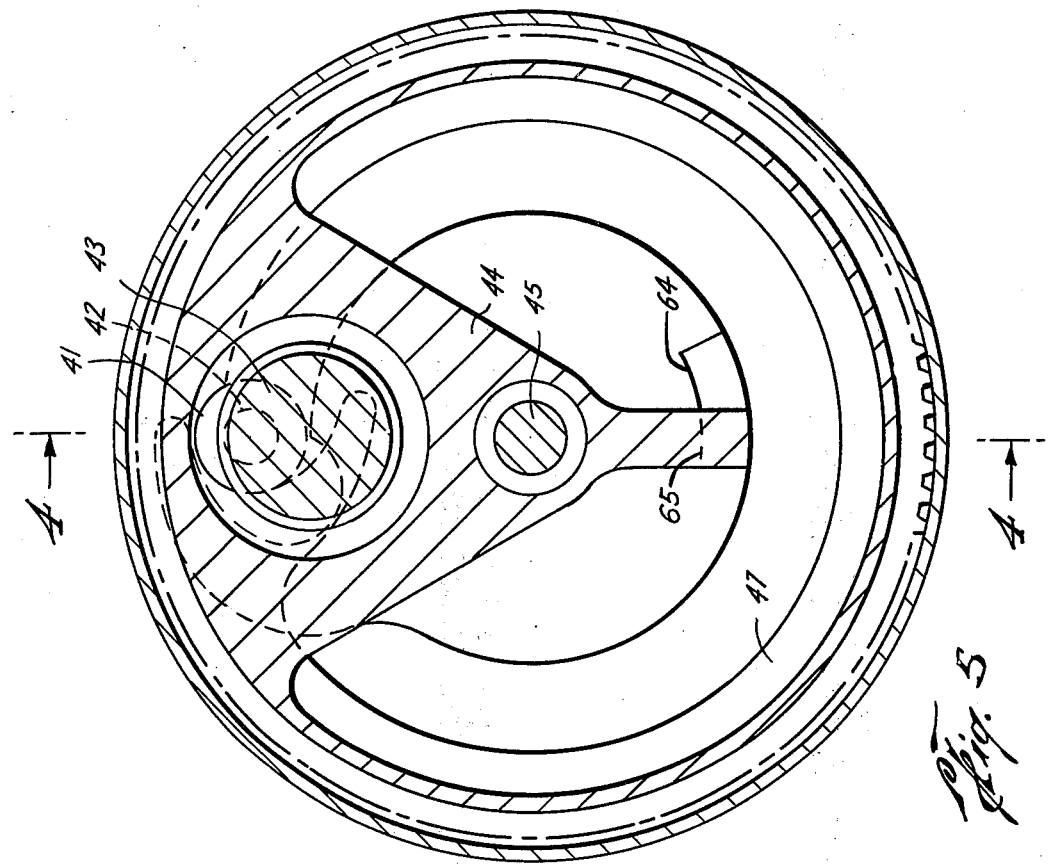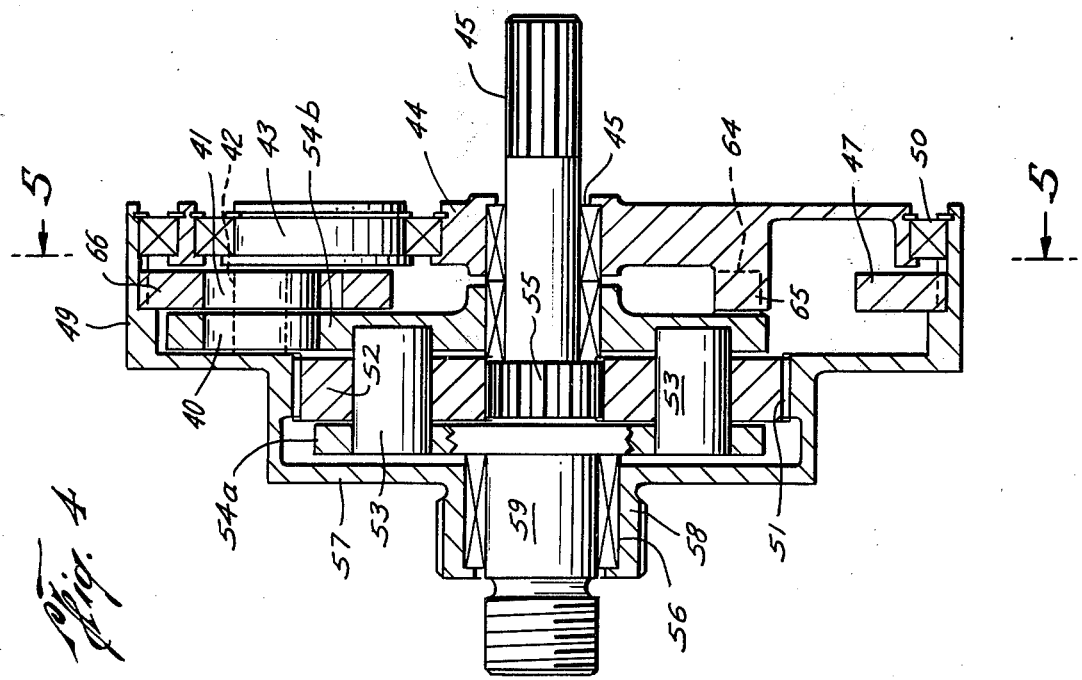

SEQUENCING DEVICE UTILIZING PLANETARY GEAR SET

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 45 U.S.C. 2457).

FIELD OF THE INVENTION

This invention relates to sequencing devices and more particularly to such devices having novel modifications of an epicyclic gear set to provide two output shafts sequentially operated by a single input shaft capable of being driven to limited and reversible degrees of rotation.

BACKGROUND OF THE INVENTION

Sequencing devices have applications in many industries. For instance, arcraft, automotive, home appliance, avionics, food processing, packaging, textile procesing, and others, may utilize sequencers in automated production and processing equipment to provide intermittent rotary motion of more than one output shaft. However, the sequencers heretofore used have certain disadvantages. Geneva mechanisms and mutilated gears are not suited for high loading. All, including cam and track followers, ratchets, overrunning friction clutches, and slidercrank linkages are heavy and bulky and have only a single output. Some must be combined, in some cases, to produce intermittent rotary motion. All the mentioned prior art devices, except mutilated gears, produce varying torque within the stages. There is a need for a compact, relatively lightweight sequencer incorporated with a speed reducer and utilizing a reversible motion input with individual sequential outputs, each operating at constant speeds, and which are reversed in direction of rotation of the input shaft.

SUMMARY OF THE INVENTION

The object of this invention is to provide such a speed reduction-sequencing device to satisfy this need. The device disclosed herein consists of a single planetary differential type or epicyclic gear set having single reversible rotating input shaft rigidly mounting a sun gear, a pair of coaxial output shafts, a ring gear member bearing-mounted for rotation about said input shaft rigidly connected to one of said outputs, and planetary gears meshing with said sun and ring gears and mounted on a carrier member connected to the other output. Latch rollers are pivotally carried by the fixed housing of the device and positioned to be engaged by hook like elements movable, respectively, with the ring gear and carrier members for alternately shifting the latch rollers and locking and unlocking said members to sequentially and automatically actuate said outputs.

A complete cycle of operation for the device disclosed herein, consists of movement (generally a driven movement) of the input shaft through an angular motion (amount to be established by design), in one direction, to a positive stop position, followed by movement in the opposite rotational direction by the shaft to its "start" position. During maximum excursion of the input shaft, both output shafts, in sequence, will be driven to their positive stop positions, then, in exactly inverted sequence, they too will be repositioned to their "start" positions with operations being reversed in a sequence exactly opposite to the original performance sequence, as the input shaft is driven back to its "start" position.

Maximum angular excursion of the two output shafts and the associated excursion of the input shaft are controlled by the position at which the outer back edge of the two sequencing hooks contact the roller or roller support link, depending on direction of input shaft rotation. If less than maximum output shaft motion is desired, external restraint means can be employed to limit motion of the input shaft.

Rotation of the input shaft in one direction produces sequential motion of the two output shafts, one remaining stationary while the other operates to perform its functions until the second shaft, upon ahalting of the first, rotates in a direction opposite to that of the first output shaft until it completes its functions.

Upon reversal of direction of input shaft motion, the sequence of operations controlled by the output shafts is reversed as is the direction of rotation and sequence of motion of the output shafts proper. At any given position of the input shaft, throughout its full range, which may be several hundred or a thousand or more degrees of rotation, the positions of the output shafts are precisely fixed and locked to the position of the input shaft. Upon recycle of the device's motion, operations performed by the output shafts are reversely recycled so that condition of each operation is rigidly fixed to the orientation of the input shaft.

BRIEF DESCRIPTION OF THE DRAWINGS

In the accompanying drawings which illustrate the invention

FIG. 1 is a vertical longitudinal center section taken substantially on line 1—1 of FIG. 3B.

FIG. 2 is a transverse section taken on line 2—2 of FIG. 1.

FIGS. 3A-3D are schematic sections, taken on line 3B—3B of FIG. 1, but showing the sequencing parts in different operative positions.

FIG. 4 is a vertical longitudinal sectional view of a modification and is taken on line 4—4 of FIG. 5.

FIG. 5 is a transverse section taken on line 5—5 of FIG. 4.

FIG. 6 is an exploded view of the device in FIGS. 4 and 5.

DETAILED DESCRIPTION OF THE DRAWINGS

The form of the invention in FIGS. 1-3D comprises a fixed housing wall 10, centrally through which extends the drive input shaft 11 received in bearings 12 and 13 and rigidly mounting at its extremity the sun gear 14 of an epicyclic gear train. Meshing with the sun gear are planet gears 15 carried in quadrature on spindles 16 seated in the longitudinally spaced walls 17a and 17b of the planetary carrier 17. Encompassing the planet gears and other parts to be described is the housing 18 forming the rear gear with teeth 19 which mesh with planet gears 15. The right hand end of housing 18 is carried through bearing 20 on the periphery of fixed housing wall 10. A central hollow boss 21, at the left end of housing 18 and in alignment with input-drive shaft 11, forms the ring gear output shaft. Supported in bearing 23 and coaxial with shaft 21 is the planetary output shaft 22. Shafts 21 and 22 have external teeth or other configurations for transmitting output torque, respectively, from the ring gear-housing and planetary carrier 17.

A short boss 26 (FIG. 3A) is seated at its right end in fixed wall 10 and inwardly mounts a shaft 68 which rotatably mounts the latch pivot arm 27. A shaft 28 extends transversely through the distal portion of arm 27 and rotatably mounts on opposite sides of the arm the latch rollers 29 and 30. The left hand roller 29 (FIG. 1) is abreast of the inner (right hand) planet carrier wall 17b and above the rightwardly projecting hub part 17c of the carrier. As best shown in FIGS. 3A–3D, a hook 31 (carrier hook) projects radially from part 17c, then curves upwardly and circumferentially about roller 29. An approximately semi-circular notch 34 is formed in the inner edge of hook 31 adjacent its junction with hub portion 17c.

The other latch roller 30 lies between pivoted arm 27 and fixed end wall 10 and is co-planar with a ring gear appendage ring 35 which is splined to and, thus, rotates with ring gear housing 18. A curved ring gear latch hook 36 projects inwardly from ring 35 forming with the latter the slightly more than semi-circular notch or pocket 37. The hooks and notches or pockets 34 and 37 are shaped and positioned relative to the pivoted latch rollers to successively cause seating of the carrier latch roller 29 in notch 34, to lock the carrier, and at or about the same time, unlock the ring gear by shifting its roller 30 out of notch 37.

Operation: FIGS. 3A–3D illustrate operation of the first form of the combination sequencing-epicyclic gear train device arranged to produce two sequential responses to limited uni-directional motion of the input-drive shaft 11. At the start of the cycle (FIG. 3A), latch roller 30 is seated in notch 37 to lock ring-ear housing 18 and its outpout shaft 21. An input shaft 11 turns clockwise, planet carrier 17 turns clockwise and, eventually its hook 31 engages planet carrier latch roller 29 (FIG. 3b and 3c) in a manner to rotate arm 27 so as to cause roller 29 to move out of notch 37, thereby releasing the ring gear. Shortly thereafter, the other latch roller 29 seats in notch 34 locking planet carrier 17. Thus, at the transfer, carrier output stops and, in sequence, ring gear output starts in the counter-clockwise direction. In this form, there is a brief period of concurrent motion of outputs 21 and 22, in opposite directions, at the transfer. Rotation of the ring gear and its output 22 continues until input shaft 11 stops and may be reversed. This brings ring 35 back to the FIG. 3c position, then to FIG. 3b where it stops. Carrier rotation begun at FIG. 3c position continues to the FIG. 3a position where the input rotation stops at the end of the cycle.

In the form in FIGS. 4, 5 and 6, the overlap motion of the outputs at the transfer is eliminated, essentially by shortening the pivoted latch arm to equal the latch roller radius. The latch rollers 40 and 41 are carried side by side on the short shaft 42 projecting from a disc 43 and eccentric of the disc by a distance equal to the radius of the rollers. Disc 43 is rotatably secured in and co-planar with the fixed housing wall 44. Input shaft 45 is coaxially supported by wall 44 in bearing 46. The ring gear appendage ring 47 is splined within and to ring gear housing 49 supported on bearing 50 and has internal teeth 51 meshing with planet gears 52 carried in quadrature by spindles 33 seated in the longitudinally spaced walls 54a and 54b of the planet carrier 54. The planets 52 also mesh with sun gear 55 at the inner end of input shaft 45.

The toothed output shaft 56 projects centrally from the end wall portion 57 of housing 49 and coaxially supports, through a bearing 58, the carrier output shaft 59.

Projecting radially and circumferentially from planet carrier inner (right hand) wall 54b and about latch roller 40 is the planet hook 62 which forms with the wall the notch 63. Carrier wall 54 also has a lug 64 in its lower part receiving and coplanar with a lug 65 projecting inwardly from the lower portion of fixed housing wall 44 for limiting rotation of the planet carrier. The ring gear hook 66 projects inwardly from ring gear appendage ring 47, partly above ring gear latch roller 41 and, with the ring 47, forms the notch 67.

Operation of the Modification: At the start (FIG. 6a) latch roller 41 is seated in notch 67, locking the ring gear. Clockwise rotation of input shaft 45 causes clockwise rotation of carrier 54 and its output shaft 59. Ultimately, carrier hook 62 engages roller 40 in its path in a manner to shift both rollers 40 and 41 (FIGS. 6b and 6c) releasing ring 47 from roller 41 so that ring gear output begins movement reversely, while, coincidentally, moving roller 40 into notch 63, locking the carrier and its output 59. Ring 47 continues its reverse movement until input shaft 45 stops. As before, reversing of shaft 45 reverses the sequence through FIGS. 6c and 6b positions to the starting position (FIG. 6a).

Consequently, there is provided in both forms a combined epicyclic gear train and sequencer in which limited continuous movement of the input shaft produces in turn rotation of output 22 at one torque and speed and then opposite rotation of output 22 at lower torque and higher speed. Of course, several of the gear train parts are utilized in the sequencing action with resultant reduction in bulk, weight, and cost of other apparatus for like purpose, and advantageous in-line operation, moreover the torque output of each stage remains constant, a feature not found in some prior art. The cycle angle of either output is fully adjustable by changing the angular size of the input stroke and the point at which the stroke stops and starts with respect to the latch point (where one output stops and the other starts).

The invention may be modified in various respects as will occur to those skilled in the art and the exclusive use of all modifications as come within the scope of the appended claims is contemplated.

I claim:

1. A sequencing device comprising an epicyclic gear train having a housing, a sun gear, a ring gear member, a plane carrier member, and planet gears on said carrier member meshing with said sun gear and said ring gear member, a pair of latch elements pivotally carried by said housing, a pair of output members actuable, respectively, with said ring gear and said carrier members, and latching notches for said elements, respectively, in said ring gear and said carrier members, and latch element actuators movable, respectively, with said ring gear and carrier member, and, respectively, substantially co-planar with different ones of said latch elements and positioned relative thereto to sequentially shift said latch elements into and out of the corresponding latch notches and, thereby, sequentially stop and start said ring gear and carrier members and said output members.

2. A sequencing device as described in claim 1 further including an input shaft movable uni-directionally during a sequence of said output members.

3. A sequencing device as described in claim 2 in which said input shaft is movable reversely to reverse the order of sequencing of said output members.

4. A sequencing device as described in claim 1 in which said latch elements are rollers carried by a pivot arm rotatably mounted on said housing.

5. A sequencing device as described in claim 4 in which said latch rollers are mounted on a shaft projecting laterally from said arm.

6. A sequencer as described in claim 4 im which said pivot arm comprises a disc co-planar and rotatably received in a wall of said housing.

7. A sequencing device as described in claim 5 in which said latch actuators are hook shaped elements projecting from appendages of said ring gear and carrier members.

8. A seqencing device as described in claim 7 in which the pivot for said pivoted latch arm and the latch roller shaft axis are spaced apart longitudinally of said arm a distance substantially equal to the latch roller radius whereby the unlocking of said ring gear member and locking of said carrier member occur at substantially the same time.

9. A sequencing device as described in claim 3 in which said input shaft is movable reversely to reverse the direction of said output member.

10. A sequencing device as described in claim 3 in which said input shaft is reversible at any point in its rotation cycle.

11. A sequencing device as described in claim 2 in which one of said output members rotates in a direction opposite to the direction of rotation of the other of said output members during the unidirectional rotation of said input shaft.

12. A sequencing device as described in claim 2 in which said sequencing of said outputs is automatically and directly controlled by the unidirectional rotation of said input shaft.

13. A sequencing device as described in claim 1 in which said output members' motions are sequenced, with one member remaining motionless while the other rotates.

14. A sequencing device as described in claim 1 in which, for any given angular position of said input shaft, the angular position of both of said output members, relative to position of said input shaft, is fixed and repeatable during any sequencing cycle.

* * * * *